United States Patent [19]

Su

[11] Patent Number: 5,610,576
[45] Date of Patent: Mar. 11, 1997

[54] CONTROL DEVICE FOR PERMITTING TWO-STAGE OPERATION OF AN ALARM SYSTEM

[75] Inventor: Simon Su, Kaohsiung Hsien, Taiwan

[73] Assignee: Lite-On Automotive Corporation, Kaohsiung, Taiwan

[21] Appl. No.: 547,407

[22] Filed: Oct. 24, 1995

[51] Int. Cl.$^6$ ................................................ B60R 25/10
[52] U.S. Cl. .................... 340/429; 340/566; 340/689; 340/692; 200/61.45 R; 200/61.52; 200/52 A; 73/DIG. 1
[58] Field of Search ...................... 340/429, 440, 340/566, 665, 683, 689, 691, 692; 200/61.45 R, 61.52, 52 A; 73/570, DIG. 1, DIG. 4

[56] References Cited

U.S. PATENT DOCUMENTS

| | | | |
|---|---|---|---|
| 4,300,135 | 11/1981 | Korn et al. | 340/690 |
| 4,358,750 | 11/1982 | Webster | 340/566 |
| 4,584,569 | 4/1986 | Lopez et al. | 340/566 |
| 5,289,159 | 2/1994 | Iwata | 340/429 |
| 5,459,447 | 10/1995 | Snyder et al. | 340/429 |
| 5,532,670 | 7/1996 | Issa et al. | 340/429 |

Primary Examiner—Donnie L. Crosland
Attorney, Agent, or Firm—Foley & Lardner

[57] ABSTRACT

A control device for an alarm system includes a sensor circuit, an amplifier circuit for amplifying a sensor signal from the sensor circuit, a filter circuit for filtering an amplified output of the amplifier circuit, and first and second comparators, each having a reference input and a test input which receives a filtered signal output of the filter circuit. The first reference signal present at the reference input of the first comparator is lower than the second reference signal present at the reference input of the second comparator. The first comparator activates an oscillator circuit to generate an intermittent activating signal when the filtered signal output exceeds the first reference signal. A first alarm signal source presents a first control signal to the alarm system upon reception of the intermittent activating signal from the oscillator circuit. The second comparator generates an activating signal that is received by a second alarm signal source when the filtered signal output exceeds the second reference signal. The second alarm signal source presents a second control signal to the alarm system upon reception of the second activating signal from the second comparator.

10 Claims, 2 Drawing Sheets

CONTROL DEVICE FOR PERMITTING TWO-STAGE OPERATION OF AN ALARM SYSTEM

BACKGROUND OF THE INVENTION

1. Field of the Invention

The invention relates to a control device for an alarm system, more particularly to a control device for permitting two-stage operation of an alarm system.

2. Description of the Related Art

The use of sensors in the control of alarm systems is known in the art. For example, a shock sensor is employed in an anti-theft alarm system commonly installed in vehicles so as to operate the alarm system upon detection of an abnormal condition.

When a highly sensitive shock sensor is employed in an anti-theft alarm system, the alarm system is activated even though the vehicle body only experienced a mild shock, such as when a passer-by or a dog (or cat) accidentally bumps into the vehicle body. This inconveniences the vehicle owner since he or she has to rush to the parking area only to find out that there is nothing wrong with the vehicle. In addition, the noise that is generated when the alarm system is accidentally activated can disturb the serenity of a neighborhood.

SUMMARY OF THE INVENTION

Therefore, the object of the present invention is to provide a control device for permitting two-stage operation of an alarm system so as to overcome the aforementioned drawbacks that are commonly associated with the prior art.

Accordingly, the control device of the present invention is to be used with an alarm system and comprises:

a sensor circuit including a shock sensor which generates a sensor signal that varies in accordance with shock experienced thereby;

an amplifier circuit connected electrically to the sensor circuit, the amplifier circuit receiving the sensor signal and providing an amplified output;

a filter circuit connected electrically to the amplifier circuit, the filter circuit receiving the amplified output and providing a filtered signal output;

a first comparator having a reference input which receives a first reference signal, and a test input which is connected electrically to the filter circuit and which receives the filtered signal output, the first comparator generating a first activating signal when the filtered signal output exceeds the first reference signal;

a second comparator having a reference input which receives a second reference signal, and a test input which is connected electrically to the filter circuit and which receives the filtered signal output, the second reference signal being greater than the first reference signal, the second comparator generating a second activating signal when the filtered signal output exceeds the second reference signal;

an oscillator circuit connected electrically to the first comparator, the oscillator circuit generating an intermittent activating signal upon reception of the first activating signal from the first comparator;

a first alarm signal source connected electrically to the oscillator circuit and adapted to be connected electrically to the alarm system, the first alarm signal source presenting a first control signal to the alarm system upon reception of the intermittent activating signal from the oscillator circuit; and a second alarm signal source connected electrically to the second comparator and adapted to be connected electrically to the alarm system, the second alarm signal source presenting a second control signal to the alarm system upon reception of the second activating signal from the second comparator.

The alarm system generates a first sound upon reception of the first control signal from the first alarm signal source and a second sound upon reception of the second control signal from the second alarm signal source.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
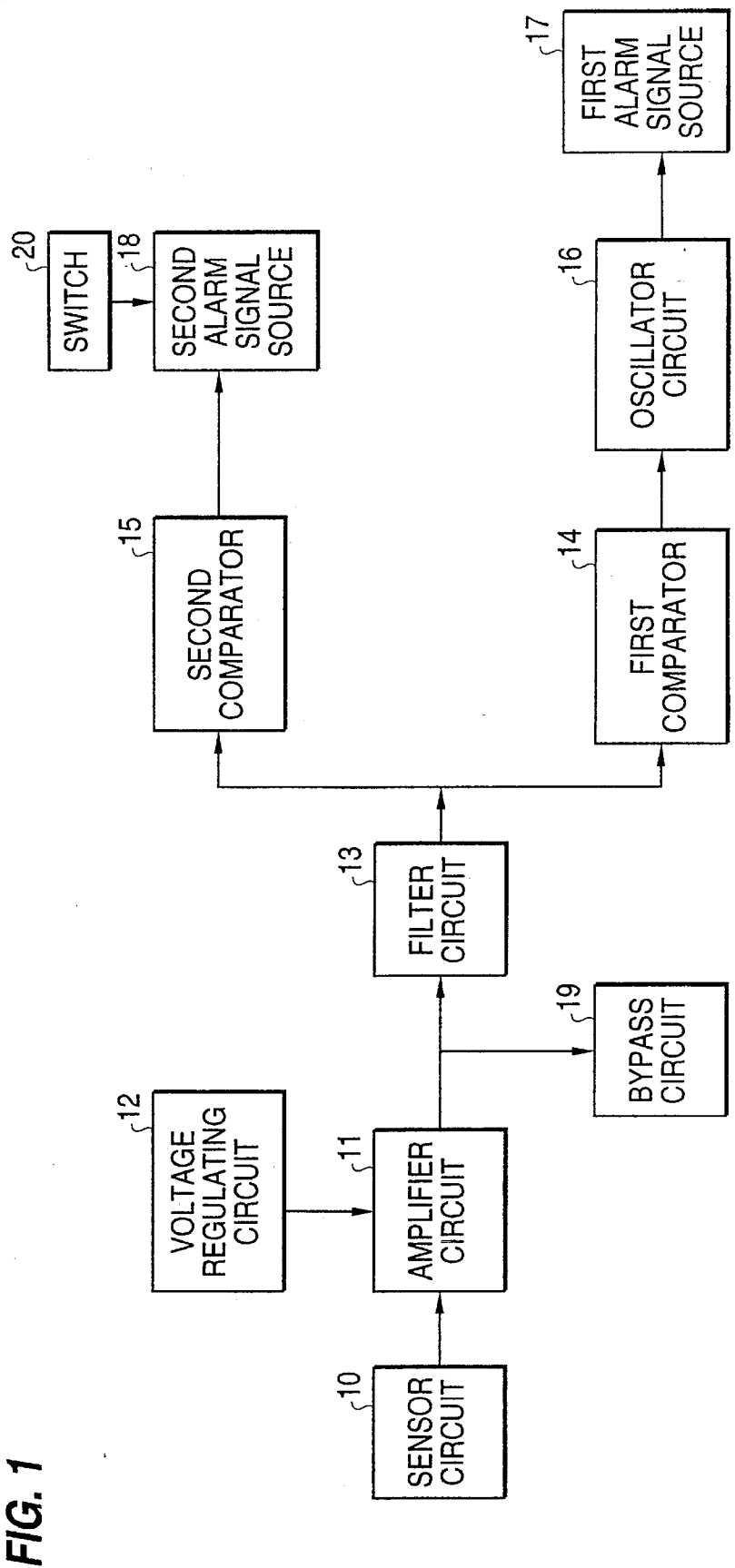
FIG. 1 is a schematic circuit block diagram of the preferred embodiment of a control device for permitting two-stage operation of an alarm system in accordance with the present invention.

Referring to FIG. 1, the preferred embodiment of a control device for permitting two-stage operation of an alarm system in accordance with the present invention is shown to comprise a sensor circuit 10 which generates a sensor signal that varies in accordance with shock experienced thereby, an amplifier circuit 11 connected electrically to the sensor circuit 10 so as to amplify the sensor signal from the latter, a voltage regulating circuit 12 for providing regulated power supply voltage to the amplifier circuit 11, a filter circuit 13 connected electrically to the amplifier circuit 11 so as to filter an amplified output of the latter, first and second comparators 14, 15 connected electrically to the filter circuit 13, an oscillator circuit 16 connected electrically to and driven operably by the first comparator 14, a first alarm signal source 17 connected electrically to the oscillator circuit 16, and a second alarm signal source 18 connected electrically to the second comparator 15. The first comparator 14 has an input reference signal which is lower than that of the second comparator Thus, the strength of the sensor signal from the sensor circuit 10 which is needed so that a first control signal can be presented at the first alarm signal source 17 is lower than that needed so that a second control signal can be presented at the second alarm signal source 18. In addition, a bypass circuit 19 is connected electrically to the output terminal of the amplifier circuit 11 and is activable so as to prevent the amplified output of the amplifier circuit 11 from reaching the first and second comparators 14, 15, thereby deactivating the control device. The second alarm signal source 18 can be further connected electrically to an independent signal source (not shown), such as a lamp device which is activated when the vehicle trunk is opened, via a switch 20 so that the second control signal may be simultaneously presented at the second alarm signal source 18 when the independent signal source is activated while the switch 20 is closed.

Figure 2:
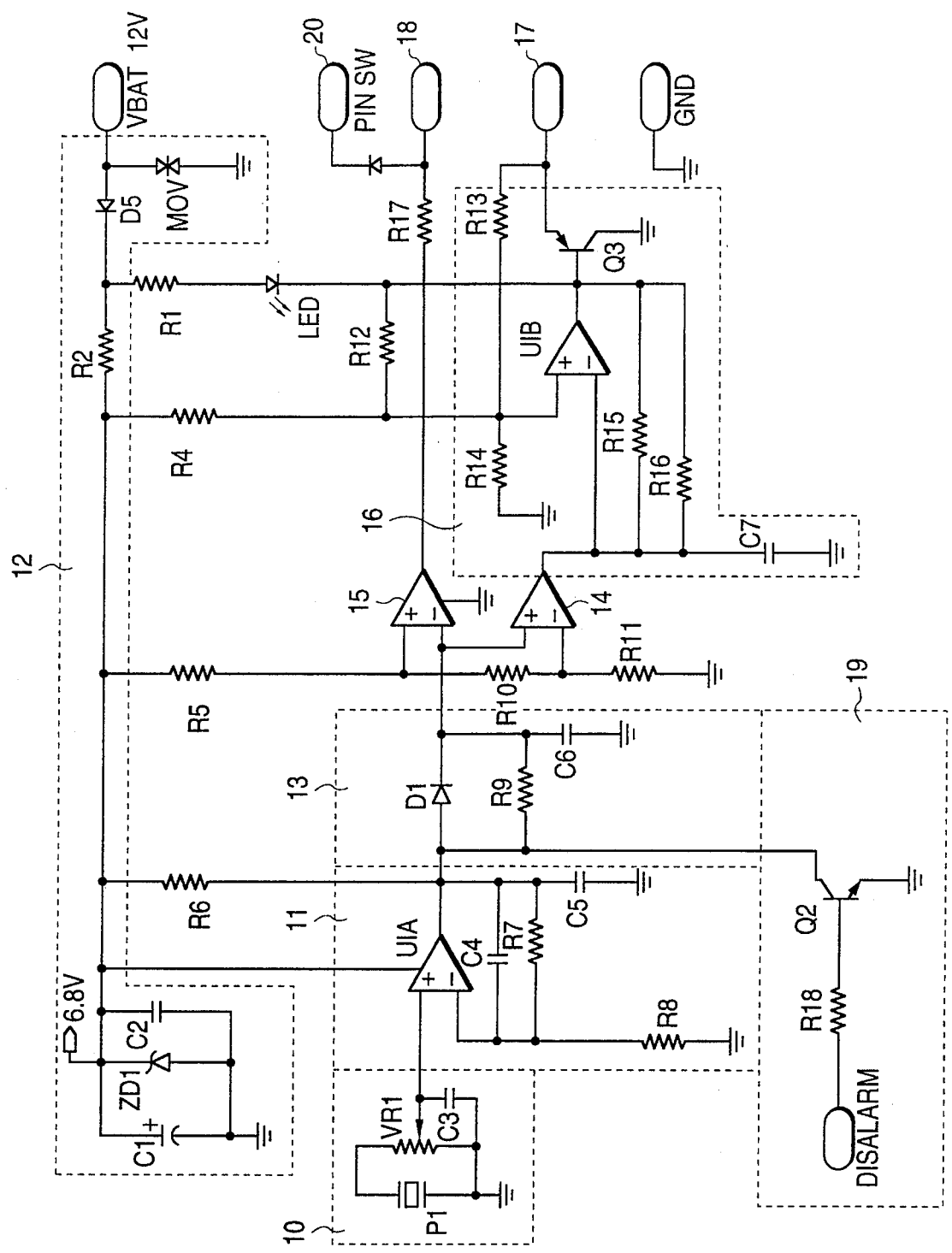
FIG. 2 is a schematic electrical circuit diagram of the preferred embodiment.

FIG. 2 illustrates a schematic electrical circuit diagram of the preferred embodiment. As shown, the sensor circuit 10 includes a sensor P1, such as a piezoelectric sensor, which is to be installed on a vehicle body (not shown) and which generates the sensor signal when the vehicle body is moved or experiences shock. The sensor circuit 10 further includes a variable resistor VR1 which is associated operably with the sensor P1 to adjust sensitivity of the latter. The variable resistor VR1 sets the amount of shock needed to be experienced by the sensor P1 before the latter starts generating the sensor signal. The amplifier circuit 11 receives the sensor signal from the sensor circuit 10 and amplifies the same. In the preferred embodiment, the voltage regulating circuit 12 includes two capacitors C1, C2 and a zener diode ZD1. The capacitors C1, C2 serve to filter the output voltage of a 12-volt power source. The zener diode ZD1 is connected across the capacitors C1, C2 and allows the voltage regulating circuit 12 to generate a constant 6.8 volts power supply voltage. Aside from providing a stable power supply voltage, the voltage regulating circuit 12 also ensures that shifting of the operating voltage does not occur when the amplifier circuit 11 is amplifying the sensor signal from the sensor circuit 10. The voltage regulating circuit 12 may further include a ripple absorbing device MOV and a diode D5 which are connected electrically to the power source so as to eliminate ripples and static interference in the output voltage of the power source and so as to prevent noise and electrical surges from affecting operation of or causing damage to the control device. The filter circuit 13 receives the amplified output of the amplifier circuit 11, and provides a filtered signal output to the first and second comparators 14, 15.

Each of the first and second comparators 14, 15 has a reference input connected electrically to a resistor bridge network constituted by three resistors R5, R10, R11. As shown, the voltage across the resistor serves as the reference signal of the first comparator 14, while the total voltage across the resistors R10, R11 serves as the reference signal of the second comparator 15. Thus, the reference signal of the first comparator 14 is lower than that of the second comparator 15. Each of the first and second comparators 14, 15 further has a test input which receives the filtered signal output of the filter circuit 13. The first and second comparators 14, 15 compare the filtered signal output with the respective reference signal. When the filtered signal output exceeds the respective reference signal, the first or second comparator 14, 15 generates a respective activating signal.

The first activating signal from the first comparator 114 is used to activate an oscillator U1B of the oscillator circuit 16. When activated, the oscillator U1B generates a train of control pulses to control intermittent conduction of a switching unit Q3. When the switching unit Q3 conducts intermittently, the first alarm signal source 17, which is adapted to be connected electrically to an alarm system (not shown), receives an intermittent activating signal and presents an intermittent control signal to the alarm system so as to activate the latter. First stage operation of the alarm system occurs at this time. When the second alarm signal source 18, which is also adapted to be connected electrically to the alarm system (not shown), receives the second activating signal from the second comparator 15, the second alarm signal source 18 presents a continuous control signal to the alarm system so as to activate the latter. The second alarm signal source 18 is also capable of receiving a third activating signal from the independent signal source via the switch 20 when the independent signal source is activated while the switch 20 is closed, thus enabling the second alarm signal source 18 to present the continuous control signal to the alarm system when the independent signal source is activated.

The bypass circuit 19 includes a discharge device Q2 which is connected electrically to the output terminal of the amplifier circuit 11. When the discharge device Q2 is activated, the amplified output of the amplifier circuit 11 is routed entirely to the discharge device Q2 and is prevented from reaching the filter circuit 13. Thus, the first and second alarm signal sources 17, 18 may be inhibited from presenting the respective control signal even though the sensor P1 of the sensor circuit 10 detects the presence of shock.

The control device of the present invention is ideal for use in an anti-theft alarm system commonly installed in vehicles. The processor unit (not shown) of the alarm system receives the control signals from the first and second alarm signal sources 17, 18 and, based on the status of the control signals, enables the alarm system to generate a warning sound, such as intermittent short sounds, or an alarm sound, such as a continuous long sound. Preferably, the warning sound is generated when the processor unit receives the intermittent control signal from the first alarm signal source 17, while the alarm sound is generated when the processor unit receives the continuous control signal from the second alarm signal source 18. It should be noted that the construction of an alarm system which can be operated so as to generate two types of sounds is known to one skilled in the art and will not be detailed herein.

As mentioned beforehand, the reference signal of the first comparator 14 is lower than the reference signal of the second comparator 15. Thus, the strength of the sensor signal from the sensor circuit 10 which is needed so that the intermittent control signal can be presented at the first alarm signal source 17 is lower than that needed so that the continuous control signal can be presented at the second alarm signal source 18. Therefore, when the strength of the filtered signal output is between that of the reference signals of the first and second comparators 14, 15, this indicates that the sensor P1 has experienced mild shock and that the vehicle which has been installed with the alarm system that uses the control device of the present invention is in no danger of being stolen. At this time, the first comparator 14 generates the first activating signal, thereby activating the oscillator circuit 16 to generate the intermittent activating signal and cause the first alarm signal source 17 to present the intermittent control signal to the alarm system. The alarm system generates the warning sound at this stage.

When the strength of the filtered signal output is greater than that of the reference signal of the second comparator 15, this indicates that the sensor P1 is experiencing severe shock and that the vehicle is in danger of being stolen. The second comparator 15 generates the continuous activating signal, thereby causing the second alarm signal source 18 to provide the continuous control signal to the alarm system. The alarm system generates the alarm sound at this time to alert any passer-by and the vehicle owner, and to scare off the prospective thief.

It has thus been shown that the control device of the present invention is capable of providing two kinds of control signals to an alarm system in order to enable the latter to generate two different kinds of sounds depending upon the severity of shock that is experienced by the vehicle. By listening to the sound that is generated by the alarm system, one can determine whether the vehicle which incorporates the alarm system that uses the control device of the present invention is in danger of being stolen. In addition, since the sound level of the warning sound may be made smaller than that of the alarm sound, the noise that is generated when the alarm system is accidentally activated can be minimized. The object of the present invention is thus achieved.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A control device for an alarm system, comprising:

a sensor circuit including a shock sensor which generates a sensor signal that varies in accordance with shock experienced thereby;

an amplifier circuit connected electrically to said sensor circuit, said amplifier circuit receiving said sensor signal and providing an amplified output;

a filter circuit connected electrically to said amplifier circuit, said filter circuit receiving said amplified output and providing a filtered signal output;

a first comparator having a reference input which receives a first reference signal, and a test input which is connected electrically to said filter circuit and which receives said filtered signal output, said first comparator generating a first activating signal when said filtered signal output exceeds said first reference signal;

a second comparator having a reference input which receives a second reference signal, and a test input which is connected electrically to said filter circuit and which receives said filtered signal output, said second reference signal being greater than said first reference signal, said second comparator generating a second activating signal when said filtered signal output exceeds said second reference signal;

an oscillator circuit connected electrically to said first comparator, said oscillator circuit generating an intermittent activating signal upon reception of said first activating signal from said first comparator;

a first alarm signal source connected electrically to said oscillator circuit and adapted to be connected electrically to the alarm system, said first alarm signal source presenting a first control signal to the alarm system upon reception of said intermittent activating signal from said oscillator circuit; and a second alarm signal source connected electrically to said second comparator and adapted to be connected electrically to the alarm system, said second alarm signal source presenting a second control signal to the alarm system upon reception of said second activating signal from said second comparator;

whereby, the alarm system generates a first sound upon reception of said first control signal from said first alarm signal source and a second sound upon reception of said second control signal from said second alarm signal source.

2. The control device for an alarm system as claimed in claim 1, wherein said first control signal is an intermittent control signal and said second control signal is a continuous control signal.

3. The control device for an alarm system as claimed in claim 1, further comprising a voltage regulating circuit connected electrically to said amplifier circuit and adapted to be connected electrically to a power source, said voltage regulating circuit providing regulated power supply voltage to said amplifier circuit.

4. The control device for an alarm system as claimed in claim 3, wherein said voltage regulating circuit includes capacitor means for filtering output voltage of the power source, and zener diode means connected across said capacitor means so that said regulated power supply voltage can have a constant voltage.

5. The control device for an alarm system as claimed in claim 4, wherein said voltage regulating circuit further includes a ripple absorbing device and a diode which are to be connected to the power source.

6. The control device for an alarm system as claimed in claim 1, wherein said sensor circuit further includes a variable resistor which is associated operably with said sensor to adjust sensitivity of said sensor.

7. The control device for an alarm system as claimed in claim 1, further comprising a bypass circuit connected electrically to said amplifier circuit and activable so that said amplified output of said amplifier circuit is routed entirely to said bypass circuit and is prevented from reaching said filter circuit.

8. The control device for an alarm system as claimed in claim 1, wherein said oscillator circuit includes:

an oscillator connected electrically to said first comparator and generating a train of control pulses upon reception of said first activating signal; and a switching unit connected electrically to said oscillator and said first alarm signal source, said switching unit conducting intermittently upon reception of said control pulses in order to provide said intermittent activating signal to said first alarm signal source.

9. The control device for an alarm system as claimed in claim 1, wherein said second alarm signal source is adapted to be connected to an independent signal source so as to receive a third activating signal therefrom when the independent signal source is activated in order to enable said second alarm signal source to present said second control signal to the alarm system when said independent signal source is activated.

10. The control device for an alarm system as claimed in claim 9, further comprising a switch which is operable so as to connect said second alarm signal source to the independent signal source.

* * * * *